(12) United States Patent
Ohkawara et al.

(10) Patent No.: US 7,304,568 B2
(45) Date of Patent: Dec. 4, 2007

(54) VEHICLE NIGHT VISION SYSTEM

(75) Inventors: Osamu Ohkawara, deceased, late of Saitama (JP); by Nobuko Ohkawara, legal representative, Saitama (JP); Yoshimitsu Ishida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 11/229,345

(22) Filed: Sep. 16, 2005

(65) Prior Publication Data

US 2006/0186347 A1    Aug. 24, 2006

(30) Foreign Application Priority Data

Sep. 17, 2004   (JP)   ............... 2004-270769

(51) Int. Cl.
  *B60Q 1/00*   (2006.01)
(52) U.S. Cl. ............... 340/438; 340/691.1; 340/815.4; 250/472.1
(58) Field of Classification Search ............... 340/904, 340/438, 691.1, 815.4; 250/472.1
  See application file for complete search history.

(56) References Cited

U.S. PATENT DOCUMENTS 4,236,099 A * 11/1980 Rosenblum ............... 315/83
6,587,573 B1 * 7/2003 Stam et al. ............... 382/104
6,611,610 B1 * 8/2003 Stam et al. ............... 382/104
6,795,237 B1 * 9/2004 Marinelli et al. ............ 359/353
6,967,569 B2 * 11/2005 Weber et al. ............... 340/436
2005/0065683 A1 * 3/2005 Remillard et al. ............ 701/36
2005/0269481 A1 * 12/2005 David et al. ............ 250/208.1
2006/0244829 A1 * 11/2006 Kato et al. ............... 348/148

FOREIGN PATENT DOCUMENTS

JP   2003-040033   2/2003

* cited by examiner

*Primary Examiner*—Jeffery Hofsass
*Assistant Examiner*—Edny Labbees
(74) *Attorney, Agent, or Firm*—Carrier, Blackman & Associates, P.C.; Joseph P. Carrier; William D Blackman

(57) ABSTRACT

In a vehicle night vision system, the display unit is activated only when an illumination level below the prescribed level has persisted for more than the prescribed period of time so that the display unit would not be activated when the low illumination level lasts only for a short period of time and the night vision system would not be required. Therefore, when the vehicle passes through a short tunnel during daytime, the display unit would not be activated and the vehicle operator is prevented from being unnecessarily distracted. On the other hand, when the vehicle passes through a long tunnel or when the sun has set and the illumination level of the road ahead is low, the night vision system is activated without fail, and assists the vehicle operator's vision.

8 Claims, 5 Drawing Sheets

VEHICLE NIGHT VISION SYSTEM

TECHNICAL FIELD

The present invention relates to a vehicle night vision system which captures the image of the road ahead of the vehicle by using an infrared camera and displays the captured image on an onboard image display typically consisting of a head-up-display to assist the vehicle operator's vision at night or when it is otherwise dark.

BACKGROUND OF THE INVENTION

For the purpose of supplementing a vehicle operator's nighttime visual information that is made available by headlights, it has been proposed to use a vehicle night vision system, and such an example is disclosed in Japanese patent laid open publication No.2003-40033. In this conventional nigh vision system, the night vision system is activated when the surrounding illumination is below a prescribed level and, additionally, the headlights are turned on by the vehicle operator.

For the purpose of supplementing a vehicle operator's nighttime visual information that is made available by headlights, it has been proposed to use a vehicle night vision system, and such an example is disclosed in Japanese patent laid open publication No.2003-40033. In this conventional night vision system, the night vision system is activated when the surrounding illumination is below a prescribed level and, additionally, the headlights are turned on by the vehicle operator.

BRIEF SUMMARY OF THE INVENTION

In view of such problems of the prior art, a primary object of the present invention is to provide a vehicle night vision system which can be activated only at appropriate time.

A second object of the present invention is to provide a vehicle night vision system which is easy to operate and would not distract the vehicle operator.

According to the present invention, at least some of such objects of the present invention can be accomplished by providing a vehicle night vision system, comprising: an infrared camera mounted on a part of a vehicle body; an onboard display unit for displaying at least an image captured by the infrared camera; an illumination sensor adapted to detect an illumination level exterior of the vehicle body; and a control unit for displaying an image captured by the infrared camera on the display unit and controlling the display unit according to an output signal from the illumination sensor; wherein the control unit activates the display unit when an illumination level detected by the illumination sensor has persisted to be below a prescribed level for a prescribed period of time.

Because the display unit is activated only when an illumination level below the prescribed level has persisted for more than the prescribed period of time, the display unit would not be activated when the low illumination level lasts only for a short period of time and the night vision system would not be required. Therefore, when the vehicle passes through a short tunnel during daytime, the display unit would not be activated and the vehicle operator is prevented from being unnecessarily distracted. On the other hand, when the vehicle passes through a long tunnel or when the sun has set and the illumination level of the road ahead is low, the night vision system is activated without fail, and assists the vehicle operator's vision.

For the convenience of the vehicle operator, the vehicle night vision system may further comprise an operating mode selection switch that includes a position for a synchronizing mode for associating an operation of the display unit with the output signal from the illumination sensor and a position for a manual mode for manually determining an operation of the display unit.

According to a preferred embodiment of the present invention, the night vision system further comprises a manual command switch for selectively activating and deactivating the display unit when the synchronizing mode is selected by the operating mode selection switch. This manual command switch may also be adapted to manually terminate an operation of the display unit without regard to the operating mode selected by the operating mode selection switch. It is also possible to provide these manual command switches as two separate switches.

Typically, the display unit is adapted to be deployed in an operating state and retracted in a non-operating state, and comprises a head up display unit.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
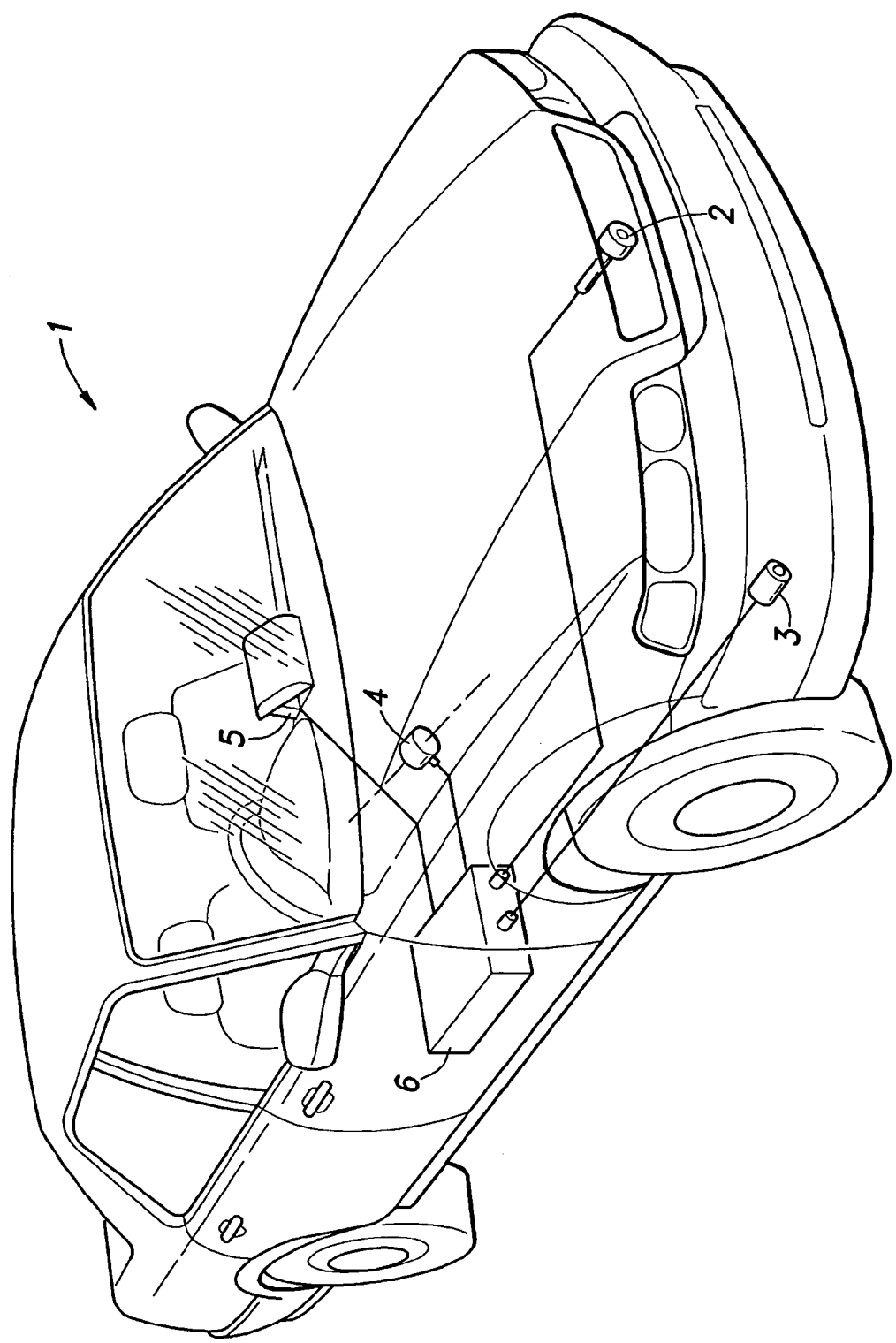
FIG. 1 is a transparent view of an automobile incorporated with a night vision system embodying the present invention.
Figure 2:
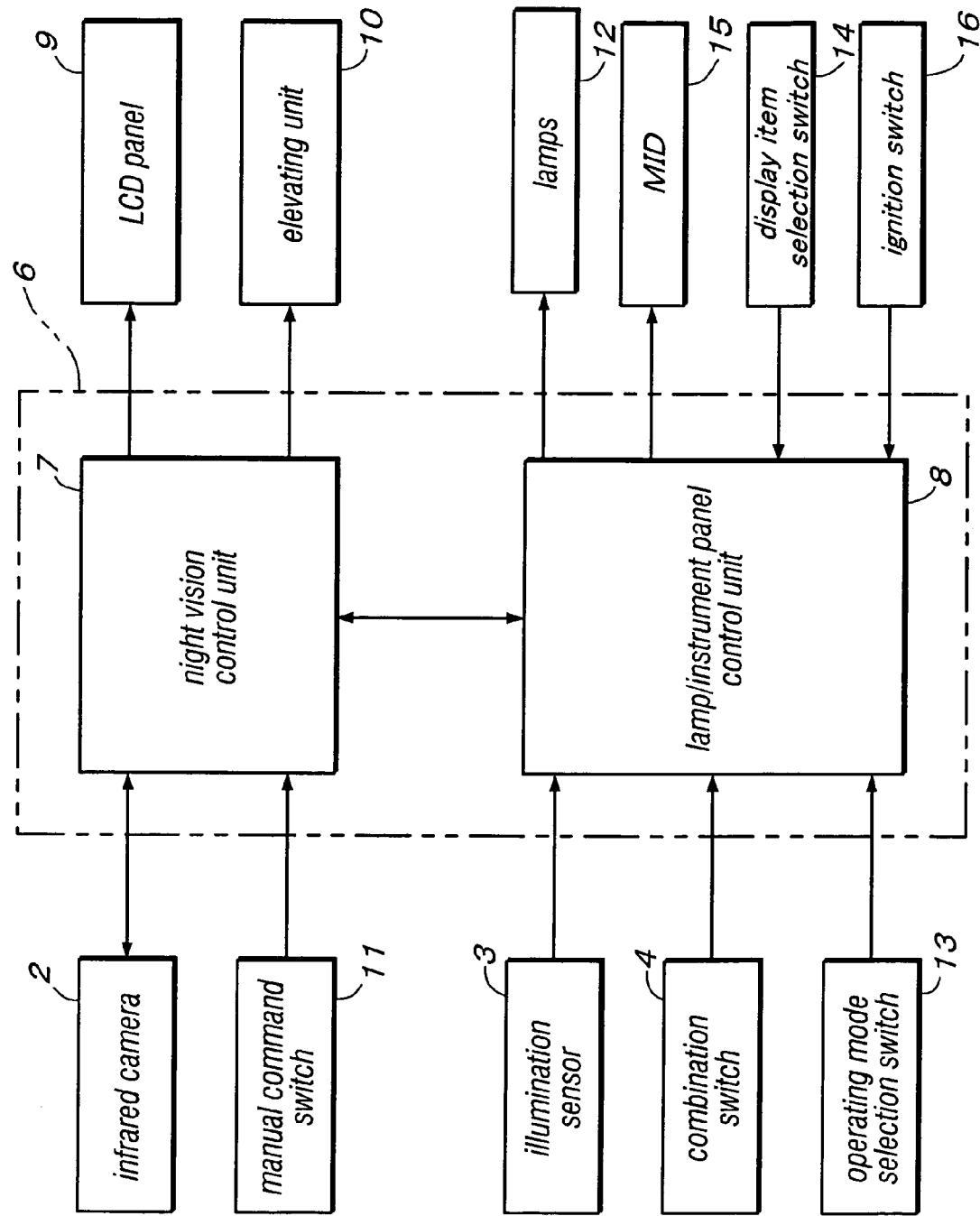
FIG. 2 is a block diagram of the night vision system according to the present invention.

FIGS. 1 and 2 generally illustrate a vehicle night vision system embodying the present invention. This night vision system 1 comprises an infrared camera 2 mounted centrally on a front end of an automobile, an illumination sensor 3 mounted on a suitable part of the vehicle body to detect the illumination of the exterior of the vehicle body, a combination switch 4 mounted on a steering column for the control of the headlights and other lamps of the automobile, a head-up display (HUD) 5 typically consisting of a concave mirror that is retractably mounted centrally on the dashboard or any other place visible from the driver's seat, and a control unit 6 which controls the overall operation of the system.

The infrared camera 2 may consist of two cameras so that a stereoscopic view can be captured and the distance to the object may be measured. It is also possible to provide an arrangement for pointing the camera 2 in a desired direction depending on the running condition of the vehicle and attitude of the vehicle body.

The control unit 6 comprises a night vision control unit 7 and a lamp/instrument panel control unit 8. The night vision control unit 7 comprises an image processing circuit for extracting necessary information from the image captured by the infrared camera 2 and converting the extracted information into pixel data that can be displayed on an LCD panel 9, a driver circuit for controlling the position of the infrared camera 2 and the operation of an elevating device 10 for the HUD 5 and a manual command signal processing circuit for processing manual command signals produced from a manual command switch 11 which may consist of pushbuttons or the like typically provided in an appropriate part of the instrument panel.

Figure 3:
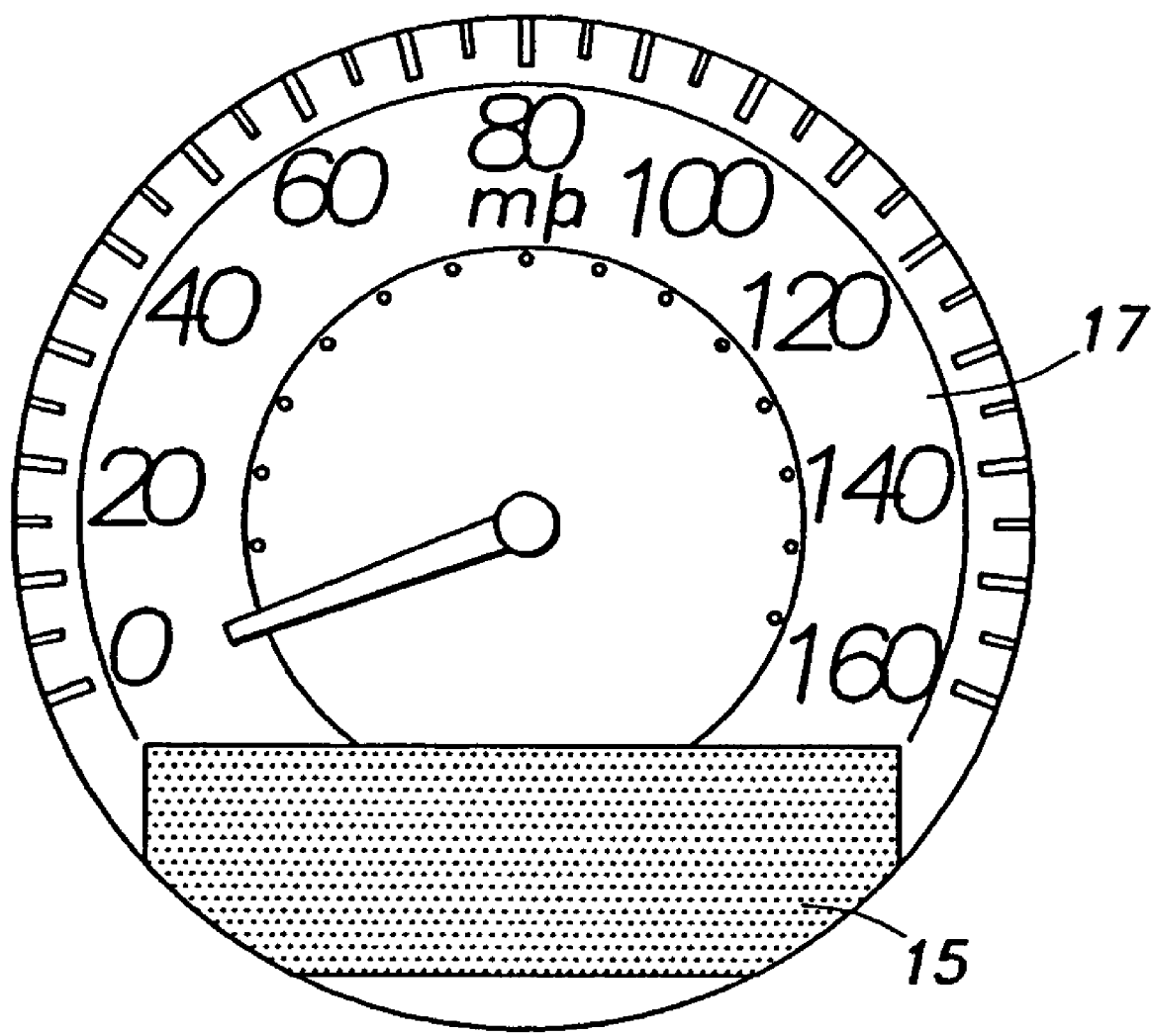
FIG. 3 is a front view of the speedometer.

The lamp/instrument panel control unit 8 comprises a lamp control circuit for controlling the turning on and off of lamps 12 (which may include headlights and instrument panel illumination lamps) according to the signal from the illumination sensor 3 and signals from the combination switch 4, an operating mode setup circuit (customized circuit) for selecting the synchronization/de-synchronization of the night vision system 1 according to the signal from the illumination sensor 3 and signal from the lamp system depending on the position of an operating mode selection switch 13 selected by the vehicle operator and a driver circuit for a multi-information display (MID; see FIG. 3) 15 which consists of an LCD panel provided in association with a speedometer to display the operating conditions of various parts according to the position of a display item selection switch 14 (provided, for instance, on a suitable part of the steering column) selected by the vehicle operator. The lamp/instrument panel control unit 8 is activated by the ON signal of an ignition switch 16.

The combination switch 4 is not different from a known combination switch in including a manual switch for selecting one of three positions including an off position for turning off all of the lamps, a small position for turning on the tail lamps and small lamps, and a headlight position for turning on the tail lamps, small lamps and headlights, and a dimmer switch for switching the headlights between high beam and low beam. The combination switch 4 further includes a light control model selection switch which selects an auto mode for automatically turning on and off the headlights depending on the output signal from the illumination sensor 3 or a manual mode for turning on and off the headlights only when the vehicle operator turns on and off the headlights by operating the combination switch 4.

Now the basic mode of operation of the night vision system according to the present invention is described in the following with reference to the time chart of FIGS. 4 and 5.

In connection with the operation of the night vision system, the user can select a synchronization mode in which the HUD 5 is activated automatically according to the signal from the illumination sensor 3 and a manual mode in which the HUD 5 is activated only at the command of the user.

In connection with the operation of the lamps 12 including the headlights, the user can select an auto mode in which the headlights are turned on and off according to the signal from the illumination sensor 3 and a manual mode in which the lamps 12 are turned on and off only at the command of the user. Thus, when the synchronization mode of the night vision system is selected or when the auto mode of the lamp system is selected, the operation of the HUD 5 or lamps 12 are controlled according to the signal from the illumination sensor 13.

Figure 4:
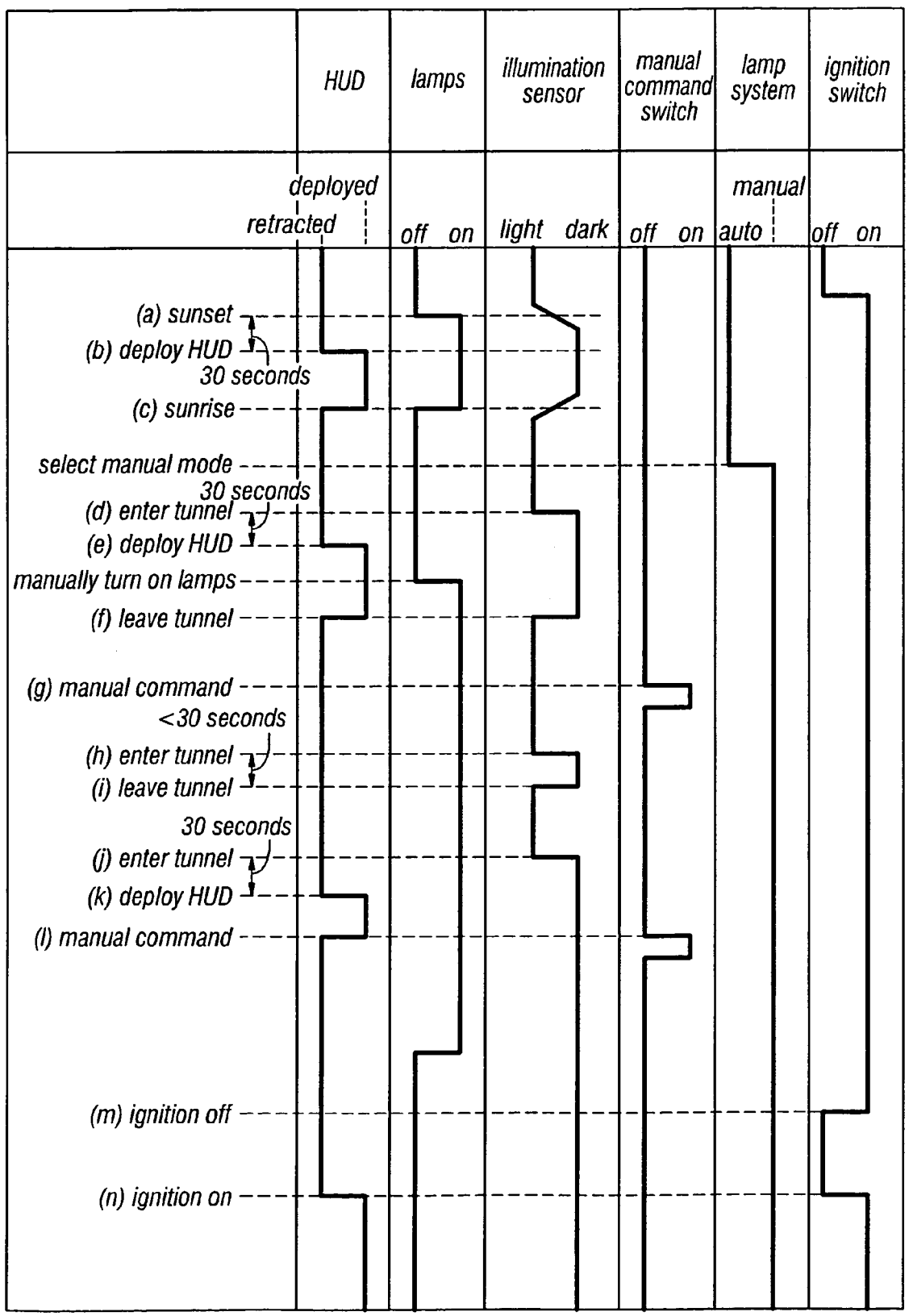
FIG. 4 is a time chart for illustrating the mode of operation of the night vision system in the synchronizing mode.
Figure 5:
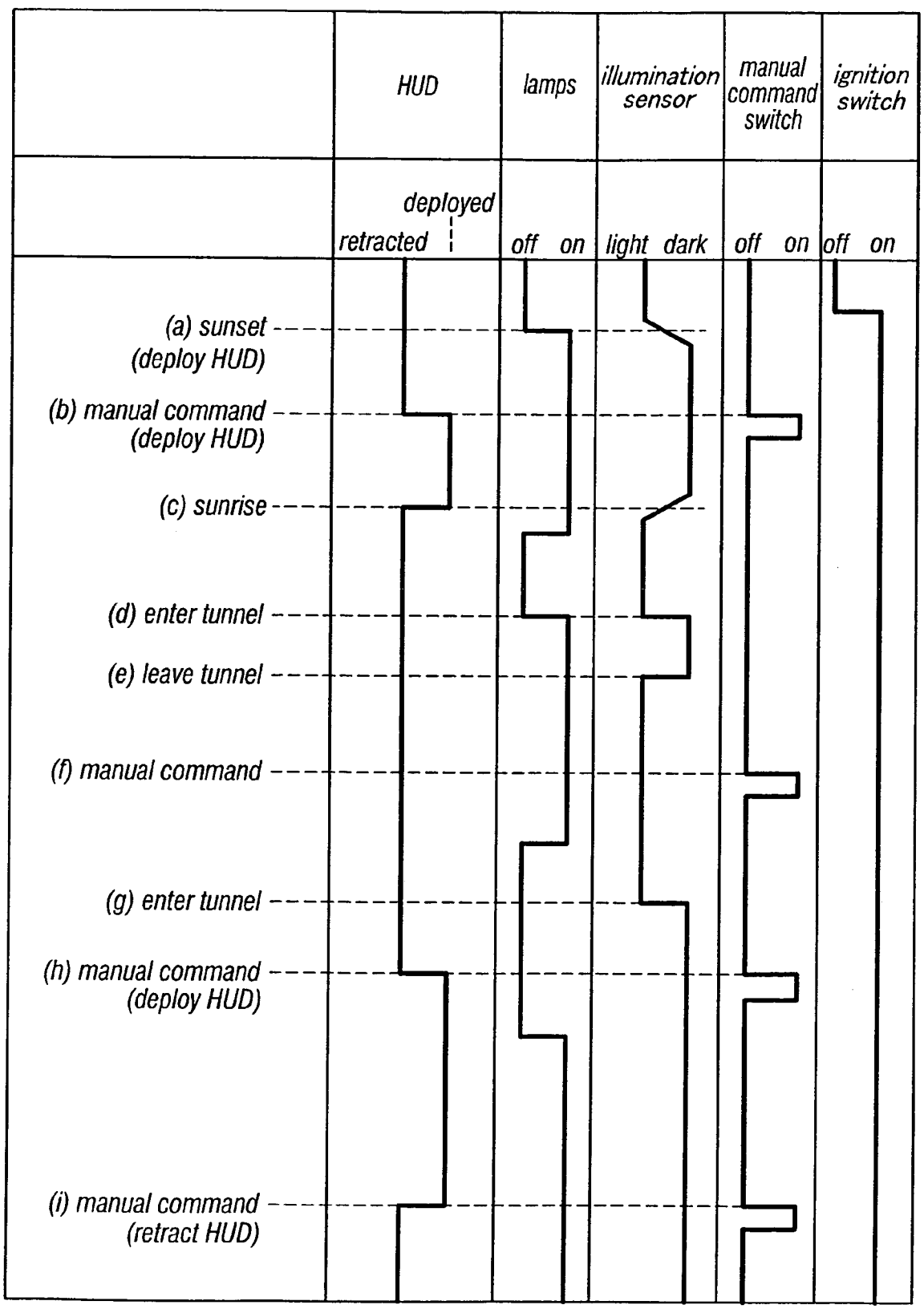
FIG. 5 is a time chart for illustrating the mode of operation of the night vision system in the manual mode.

For the operation of the night vision system, it is required that the ignition switch 16 is turned on as shown in FIG. 4. It is now supposed that the synchronization mode is selected for the night vision system and the auto mode is selected for the lamp system. When the output signal of the illumination sensor 3 indicates that the illumination level is below a certain level such as when the sun has set, the lamps 12 are automatically turned on (a). If this state persists for more than a prescribed time period (30 seconds, for instance), the HUD 5 is deployed (b). If desired, a warning may be displayed on the MID 15 a short period of time (5 seconds, for instance) before the deployment of the HUD 5. If the output signal level of the illumination sensor 3 is already below the prescribed level when the ignition switch 16 is turned on, the HUD 5 is deployed immediately.

Conversely, when the output signal level of the illumination sensor 3 increases beyond the prescribed level such as when the sun has risen, the lamps are automatically turned off and the HUD 5 is retracted into the instrument panel (c). In this case also, a warning may be displayed on the MID 15 a short period of time (5 seconds, for instance) before the retraction of the HUD 5.

Even when the manual mode is selected for the lamp system, the HUD 5 is deployed on the instrument panel if the illumination level as detected by the illumination sensor 3 continues to be below the prescribed level for the prescribed period of time without regard to the state of the lamps 12 (d, e). If the manual mode is selected for the lamp system and the lamps 12 are not turned on even though the illumination sensor 3 indicates an illumination level below the prescribed level, the HUD 5 would not be deployed and a message for soliciting the vehicle operator to turn on the headlights is displayed on the MID 15.

When the illumination sensor 3 detects the illumination level rising from a level below the prescribed level to a level above the prescribed level such as when the vehicle has passed a tunnel, even when the lamps 12 are kept turned on, the HUD 5 is immediately retracted into the instrument panel (f). If the manual command switch 11 for the night vision system is turned on while the illumination sensor 3 detects an illumination level above the prescribed level, the HUD 5 would not be deployed, and a message indicating that the use of the night vision system is prohibited during daytime is displayed on the MID 15 (g).

When the vehicle passes through a short tunnel, it is possible that the illumination level below the prescribed level continues only for a short period of time which is less than the prescribed period of time. In such a case, the HUD 5 remains retracted throughout the time the vehicle passes through the tunnel (h, i). In other words, if the illumination level detected by the illumination sensor 3 does not persist for more than the prescribed period of time (30 seconds), the HUD 5 is kept retracted in the instrument panel. Conversely, if the illumination level persists to be below the prescribed level for more than the prescribed time period (30 seconds) such as when the vehicle has entered a relatively long tunnel, the HUD 5 is deployed without regard to the state of the lamps 12 (j, k). When the vehicle has moved out of the tunnel and the illumination level has risen above the prescribed level, the HUD 5 is immediately retracted without regard to the state of the lamps. This mode of operation is similar to that described earlier in connection with the operation of the night vision system at the time when the sun has set and risen (a-c).

When the manual switch 11 (which consists of a temporary switch) is pressed when the HUD 5 is being deployed on the instrument panel as is the case when the illumination sensor 3 has detected an illumination level below the prescribed level for the prescribed period of time or when the HUD 5 is already deployed, the existing command is overridden and the HUD 5 is immediately retracted into the instrument panel (l). This state is maintained without regard to the state of the output signal from the illumination sensor and the state of the lamps until the ignition switch 16 is turned off. When the ignition switch is turned off, the manual mode of the night vision system is canceled, and the night vision system is activated in the synchronization mode when the ignition switch is turned on next time, and the HUD 5 operates in dependence on the output signal of the illumination sensor 3 (n).

In other words, the manual command switch 11 can shut down the night vision system even when the HUD 5 is being deployed or is already deployed according to the output signal from the illumination sensor 3 in the synchronization mode. Once the ignition switch 16 is turned off, this state of manual override is canceled. As this manual override is intended mainly as a measure for the time of an emergency, it is also possible to arrange, for instance by suitably rewriting the software, such that the synchronization mode can be regained by pushing a pushbutton of a keyless entry system or other actions as well as by turning off the ignition switch 16.

The mode of operation of the night vision system in the manual mode is now described in the following with reference to FIG. 5. When the manual mode is selected, without regard to the operating mode of the lamp system, the HUD 5 is deployed as soon as the vehicle operator turns on the manual command switch 11 (b) provided that the ignition switch 16 is turned on and the illuminating sensor 3 indicates a level of illumination below the prescribed level (a).

When an illumination level above the prescribed level is detected by the illumination sensor such as when the sun has risen while the night vision system is operating, the HUD 5 is automatically retracted into the instrument panel even when the lamps 12 may continue to be turned on (c).

When an illumination level below the prescribed level is detected by the illumination sensor 3 such as when the vehicle is in a tunnel, the HUD 5 will be deployed only if the vehicle operator has turned on the manual command switch 11 (d, e).

When an illumination level above the prescribed level is detected by the illumination sensor, even if the manual command switch 11 is turned on by the vehicle operator, it is disregarded, and a message saying that the night vision system cannot be used in daytime is displayed on the MID 15 (f).

When an illumination level below the prescribed level persists for a prolonged period of time such as when the vehicle is in a long tunnel or when the sun has set (g), if the vehicle operator turns on the manual command switch 11, the HUD 5 is deployed without regard to the state of the lamps 12 (h). If the lamps are turned off at such a time, a message saying the headlights should be turned on is displayed on the MID 15 and a night vision may be displayed on the HUD 5 only after the headlights 12 are turned on.

If the manual command switch 11 is turned on while the night vision system 1 is operating, the HUD 5 is immediately retracted into the instrument panel (i).

In this manner, when it is dark or the illumination level detected by the illumination sensor 3 is below the prescribed level, each one-shot pulse produced by the manual command switch 11 causes the toggle action of the HUD 5 between the deployed position and retracted position.

Similarly as was the case with the synchronization mode, if desired, a warming may be displayed on the MID 15 before deploying the HUD 5 and/or retracting the HUD 5. When deploying the HUD 5, it is desirable to have the image on the HUD 5 already displayed by the time the HUD 5 is fully deployed. This can be accomplished by keeping the night vision system in a sleep mode, instead of being fully shut down, even when the HUD 5 is retracted. To minimize the time period required before the image is to be fully displayed on the HUD 5, an interrupt routine may be used in the control program to speed up the process of displaying the image on the HUD 5.

In the foregoing embodiment, the manual command switch consisted of a temporary switch adapted to produce a one-shot pulse, but it may be replaced with a toggle switch so that the deploy/retract movement of the HUD 5 may be executed simply by throwing the switch in the corresponding direction. Such a toggle switch may also consist of an alternating pushbutton switch having a pair of pushbuttons which can be depressed only in an alternate fashion.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

We claim:

1. A vehicle night vision system, comprising;
   an infrared camera mounted on a part of a vehicle body;
   a first onboard display unit for displaying at least an image captured by the infrared camera;
   an illumination sensor adapted to detect an illumination level exterior of the vehicle body; and
   a control unit for displaying an image captured by the infrared camera on the first display unit and controlling the first display unit according to an output signal from the illumination sensor;
   wherein the control unit activates the first display unit from a non-operating state to an operating state when an illumination level detected by the illumination sensor has persisted to be below a prescribed level for a prescribed period of time.

2. The vehicle night vision system according to claim 1, further comprising an operating mode selection switch that includes a position for a synchronizing mode for associating an operation of the first display unit with the output signal from the illumination sensor and a position for a manual mode for manually determining an operation of the first display unit.

3. The vehicle night vision system according to claim 2, further comprising a manual command switch for manually terminating an operation of the first display unit without regard to the operating mode selected by the operating mode selection switch.

4. The vehicle night vision system according to claim 2, further comprising a manual command switch for selectively activating and deactivating the first display unit when the synchronizing mode is selected by the operating mode selection switch.

5. The vehicle night vision system according to claim 1, further comprising an elevating unit which deploys the first display unit in the operating state and retracts the first display unit in the non-operating state.

6. The vehicle night vision system according to claim 1, wherein the first display unit comprises a head up display unit.

7. The vehicle night vision system according to claim 1, further comprising a second display unit, wherein the second display unit displays a warning of activation of the first display unit before the first display unit is activated from the non-operating state to the operating state.

8. The vehicle night vision system according to claim 1, further comprising a second display unit, wherein the second display unit displays a warning of deactivation of the first display unit before the first display unit is de-activated from the operating state to the non-operating state.

* * * * *